US012574653B2

(12) United States Patent (10) Patent No.: US 12,574,653 B2

Gould (45) Date of Patent: Mar. 10, 2026

(54) VEHICLE IMAGING STATION

(71) Applicant: DEGOULD LIMITED, Exeter (GB)

(72) Inventor: Daniel George Gould, Exeter (GB)

( * ) Notice: Subject to any disclaimer, the term of this patent is extended or adjusted under 35 U.S.C. 154(b) by 69 days.

(21) Appl. No.: 18/562,012

(22) PCT Filed: May 18, 2022

(86) PCT No.: PCT/GB2022/051250

§ 371 (c)(1),
(2) Date: Nov. 17, 2023

(87) PCT Pub. No.: WO2022/243678

PCT Pub. Date: Nov. 24, 2022

(65) Prior Publication Data

US 2024/0244338 A1 Jul. 18, 2024

(30) Foreign Application Priority Data

May 20, 2021 (GB) ...................................... 2107230

(51) Int. Cl.
*H04N 23/90* (2023.01)
*G06T 7/00* (2017.01)
*H04N 23/56* (2023.01)

(52) U.S. Cl.
CPC ........... *H04N 23/90* (2023.01); *G06T 7/0002* (2013.01); *H04N 23/56* (2023.01)

(58) Field of Classification Search
CPC ...... F16M 11/041; F16M 13/00; F16M 13/02; G01C 9/00; G01N 21/8806;
(Continued)

(56) References Cited

U.S. PATENT DOCUMENTS

2016/0100087 A1* 4/2016 Scheich ................ G06T 1/0007
348/47
2021/0396684 A1* 12/2021 Tissandier ......... G01N 21/8806

FOREIGN PATENT DOCUMENTS

CN 112798298 A 5/2021
EP 3792619 A1 3/2021
GB 2578807 A 5/2020

OTHER PUBLICATIONS

European Patent Office, International Search Report and Written Opinion of the International Searching Authority, International Application No. PCT/GB2022/051250, 10 pages, Sep. 5, 2022.
(Continued)

*Primary Examiner* — Masum Billah
(74) *Attorney, Agent, or Firm* — Thompson Hine LLP

(57) ABSTRACT

A vehicle imaging station for imaging a vehicle including a structured light source having a first panel portion and a second panel portion. The first panel portion is spaced from the second panel portion to define a structured lighting space between them. The structured lighting space has a central axis and being sized to enable a vehicle to be driven along the central axis through the structured lighting space from an entry plane to an exit plane. The first panel portion and the second panel portion each face the structured lighting space to project a structured light pattern into the structured lighting space. The station has a first camera mounted adjacent to a side of the first panel portion closest to the entry plane on a first side of the central axis and being orientated to face the exit plane on a second side of the central axis. The station has a second camera mounted adjacent to a side of the second panel portion closest to the entry plane on the second side of the central axis and being orientated to face the exit plane on the first side of the central axis.

16 Claims, 6 Drawing Sheets

(58) Field of Classification Search

CPC ....... G01N 2021/8809; G01N 21/9515; G01N
2021/8829; G01N 21/88; G06T 7/0004;
G06T 2207/30156; G06T 2207/10024;
G06T 2207/10152; G06T 7/0002; G06T
7/586; G06T 7/90; G06T 2207/20081;
G06T 2207/20084

USPC ......................................................... 348/159

See application file for complete search history.

(56)                            References Cited

OTHER PUBLICATIONS

Intellectual Property Office, United Kingdom Combined Search and
Examination Report under Sections 17 and 18(3), which pertains to
Great Britain Application No. GB2107230.1. 8 pgs.
European Patent Office, Communication pursuant to Article 94(3)
EPC, European Patent Application No. 22726793.7, 5 pages, Jun.
13, 2025.

* cited by examiner

VEHICLE IMAGING STATION

This application is a national stage filing of International (PCT) Application No. PCT/GB2022/051250 (corresponding to International Publication No. WO 2022/243678) filed on May 18, 2022, which in turn claims priority to GB 2107230.1 filed on May 20, 2021. The entire contents of both of these applications is incorporated by reference herein.

This disclosure relates to the imaging of vehicles, particularly cars.

BACKGROUND

Over time, a vehicle may suffer external damage, such as scratches and dents, or structural damage.

It is known to detect dent damage by projecting a pattern of structured light onto a vehicle from structured light source and capturing an image of the pattern on the vehicle body. By knowing the shape of an undamaged vehicle and how that shape should change the appearance of the pattern at a particular viewing angle, dent damage can be seen as a deviation from the expected pattern.

It is known to implement such a dent detection system as an arch of structured lighting with side portions and a roof portion, arranged to project the structured light pattern onto the sides and roof of a vehicle as the vehicle passes through the arch.

The present disclosure is directed to a new vehicle imaging system for detecting dent damage, which can increase the amount of vehicle bodywork that can be imaged in a time efficient manner.

SUMMARY

According to a first aspect there is provided a vehicle imaging station comprising:

a structured light source comprising a first panel portion and a second panel portion, the first panel portion being spaced from the second panel portion to define a structured lighting space between them, the structured lighting space having a central axis or vertical plane and being sized to enable a vehicle to be driven along a pathway on a road surface aligned with the central axis or vertical plane through the structured lighting space from an entry plane to an exit plane, the first panel portion and the second panel portion each facing the structured lighting space to project a structured light pattern into the structured lighting space;

a first camera mounted adjacent to a side of the first panel portion closest to the entry plane on a first side of the central axis and being orientated to face the exit plane on a second side of the central axis; and a second camera mounted adjacent to a side of the second panel portion closest to the entry plane on the second side of the central axis and being orientated to face the exit plane on the first side of the central axis, such that, as a vehicle is driven through the structured lighting space, the first camera sees the second panel portion of the structured light source in reflection via the rear right hand side of the vehicle as it passes the exit plane on the second side of the central axis and the second camera sees the first panel portion of the structured light source in reflection via the rear left hand side of the vehicle as it passes the exit plane on the first side of the central axis.

Thus, the vehicle imagining station of the first aspect enables dents on the rear of the vehicle to be imaged using conventional structured light panel portions arranged to illuminate the sides of the vehicle, increasing the amount of dent damage which can be imaged in a single pass. Conventional structured lighting is generally arranged to project structured light patterns onto the sides of a vehicle in a generally perpendicular manner. While this enables similarly orientated dent cameras to capture images showing dents in the sides of a vehicle, it means that in order to use the structured light panel portions for dent detection on the front of rear of the vehicle, it would be necessary to rotate the vehicle by 90 degrees, requiring a wide arch and possibly a complicated turning platform. In contrast, by providing dent detecting cameras at or very close to the sides of the structured light panel portions and angled into the space between them at an angle such that each camera views the opposite side of the rear of the vehicle as it moves out of the far side of the space, the camera sees enough of the opposite structured light portion in reflection in the rear of the vehicle to enable dents to be accurately observed and imaged.

The first panel portion can be generally parallel with respect to the second panel portion and/or arranged symmetrically on either side of the central axis.

Adjacent can mean less than or equal to 0.5 m, in one case less than or equal to 0.3 m, in another case less than or equal to 0.2 m, in another case less than or equal to 0.15 m and in another case less than or equal to 0.1 m. The closer the cameras are to the sides of the respective panel portions, the better the quality of the patterned image reflection. The distance can refer to the distance between a point at which the camera optical axis extends from the lens to the side of the panel portion.

The cameras can be orientated such that the angle between their optical axes and the entry plane is between 45 degrees and 20 degrees and in one case between 45 degrees and 30 degrees. An angle of roughly 40 degrees can enable dents to be reliably observed across the full width of the rear of a vehicle.

Each panel can have a width (e.g. dimension parallel with respect to the central axis) of less than or equal to 3 m, in one case less than or equal to 2 m and in some embodiments 1.15 m. In one case the width is at least 0.5 m.

The distance between the panel portions can be less than or equal to 5 m, in one case less than or equal to 4 m, in another case less than or equal to 3 m and in some embodiments can be generally 2.5 m. In one case the distance is at least 2 m.

The structured lighting source can be configured as an arch, with a roof portion spanning the first and second panel portions and being arranged to project a structured light pattern onto the roof of the vehicle. The regions where the panel portions meet the roof portion can be curved. Base regions of the first and second panel portions can be curved so as to be convex with respect to the central axis, which can aid with observing dents on the curved undersides of the rear of a vehicle.

The first and second camera can each be mounted at a height of between 0.1 m and 2 m from the ground, in one case between 0.2 m and 1.5 m. A height of roughly 0.6 m can enable dents to be reliably observed across the full width of the rear of a vehicle.

The vehicle imaging station can further comprise a data processor and a sensor, the sensor being arranged to detect when the rear of the vehicle is at or in the region of the exit plane and transmit a signal to the data processor which causes the data processor to fire the first and second cameras one or more times.

The cameras can each comprise a digital camera, such as a Hikvision™ MV-CA050-10GC.

The vehicle imaging station can further comprise a structural frame arranged to support the structured lighting source. The cameras can be mounted to the frame.

The vehicle imaging station can further comprise third and fourth cameras arranged on the opposite side of the arch in an analogous setup with respect of the first and second cameras to image dent on the front of a vehicle as it reaches or is in the region of the entry plane.

In accordance with a second aspect, there is provided a computer implemented method of imaging dents on a vehicle using the vehicle imaging station of the first aspect, the method comprising:

detecting when the rear portion of a vehicle at or in the region of the exit plane; and capturing one or more images of the rear portion of a vehicle using the first and second cameras.

In accordance with a third aspect, there is provided a vehicle imaging station comprising:

a structured light source comprising a first panel portion and a second panel portion, the first panel portion being spaced from the second panel portion to define a structured lighting space between them, the structured lighting space having a central axis or vertical plane and being sized to enable a vehicle to be driven along a pathway on a road surface aligned with the central axis or vertical plane through the structured lighting space from an entry plane to an exit plane, the first panel portion and the second panel portion each facing the structured lighting space to project a structured light pattern into the structured lighting space;

a first camera mounted adjacent to a side of the first panel portion closest to the exit plane on a first side of the central axis and being orientated to face the entry plane on a second side of the central axis; and a second camera mounted adjacent to a side of the second panel portion closest to the exit plane on the second side of the central axis and being orientated to face the entry plane on the first side of the central axis, such that, as a vehicle is driven into the structured lighting space, the first camera sees the second panel portion of the structured light source in reflection via the front right hand side of the vehicle as it passes the entry plane on the second side of the central axis and the second camera sees the first panel portion of the structured light source in reflection via the front left hand side of the vehicle as it passes the entry plane on the first side of the central axis.

BRIEF DESCRIPTION OF THE DRAWINGS

Certain embodiments will now be described with reference to the accompanying drawings, in which.

DETAILED DESCRIPTION

Figure 1:
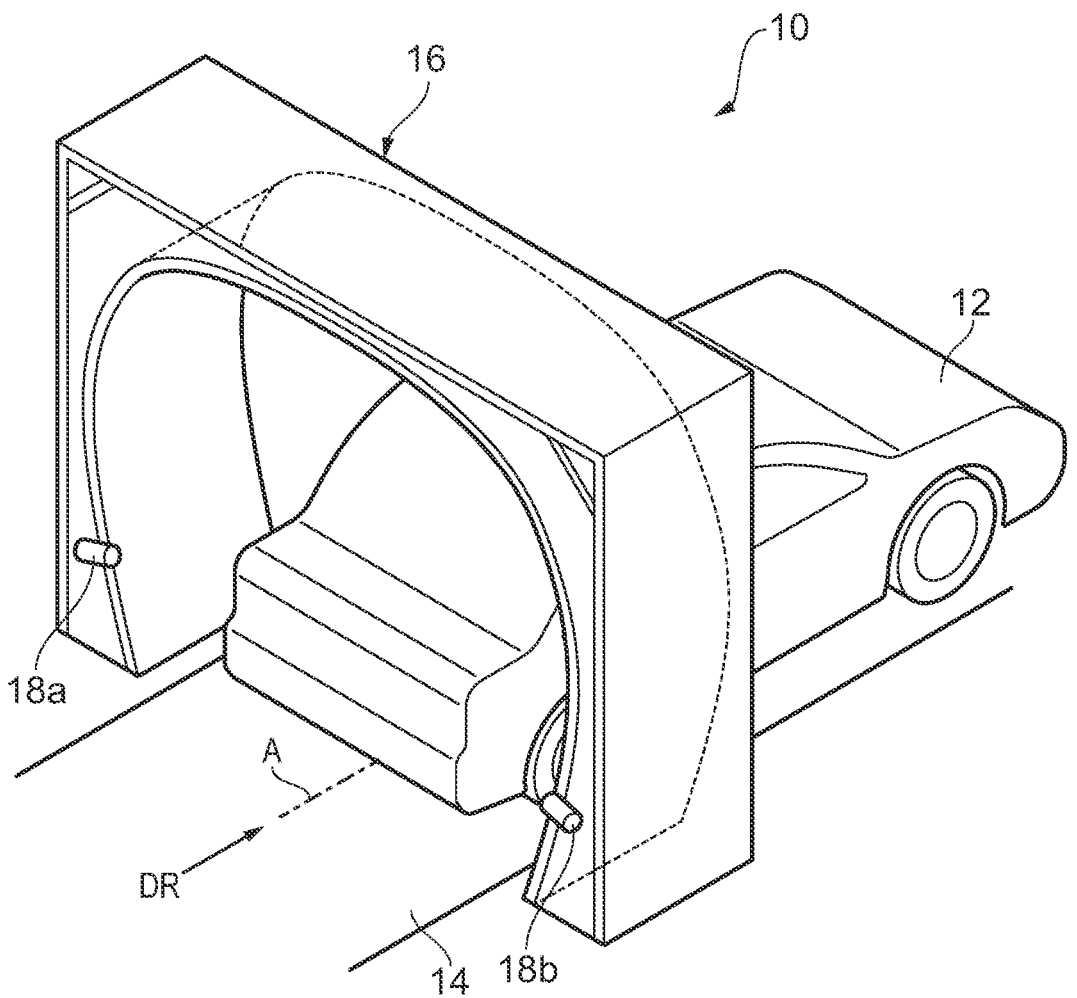
FIG. 1 is schematic diagram showing a perspective view of a vehicle imaging station according to an embodiment.

Referring to FIG. 1, a vehicle imaging station according to an embodiment is shown generally at 10. The vehicle imaging station 10 is arranged to take images of a vehicle 12 that can be used to identify damage in the form of dents in external body panels of the vehicle 12.

The vehicle imaging station 10 is arranged around a roadway 14, which is a path suitable for the vehicle 12 to travel along in a direction DR.

A structured light source in the form of a structured lighting arch 16 is provided around the roadway 14 to project a structured light pattern onto the vehicle 12 as it passes through the arch 16.

Figure 2:
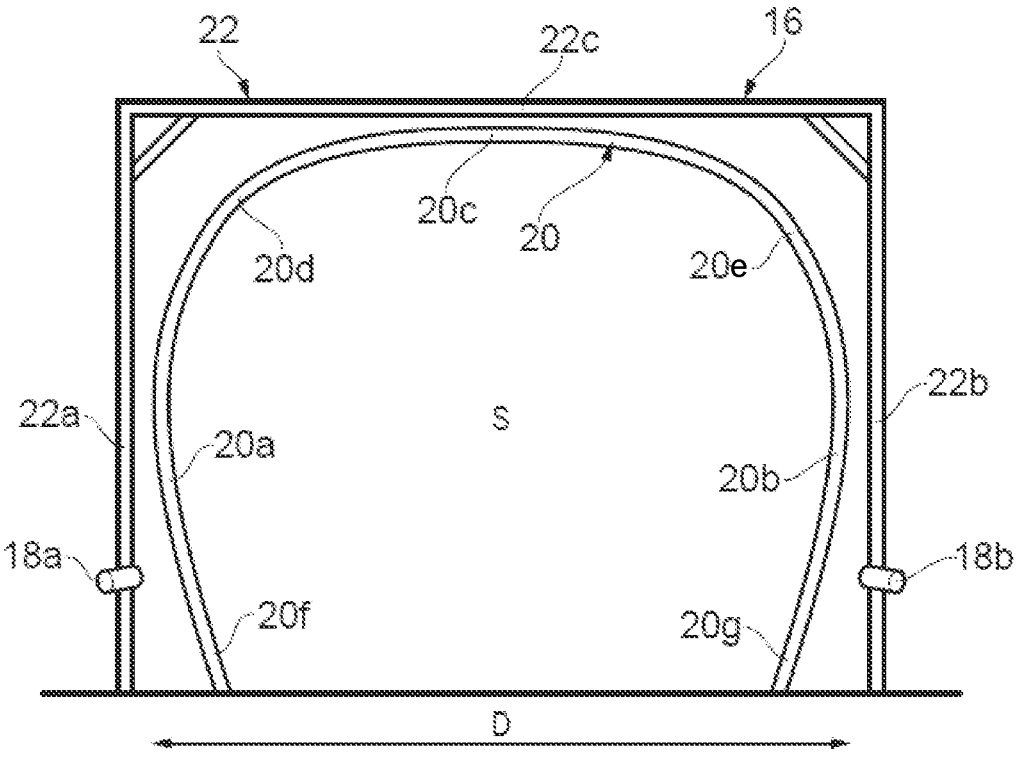
FIG. 2 is schematic diagram showing a lateral cross-section view of the vehicle imaging station of FIG. 1.
Figure 3:
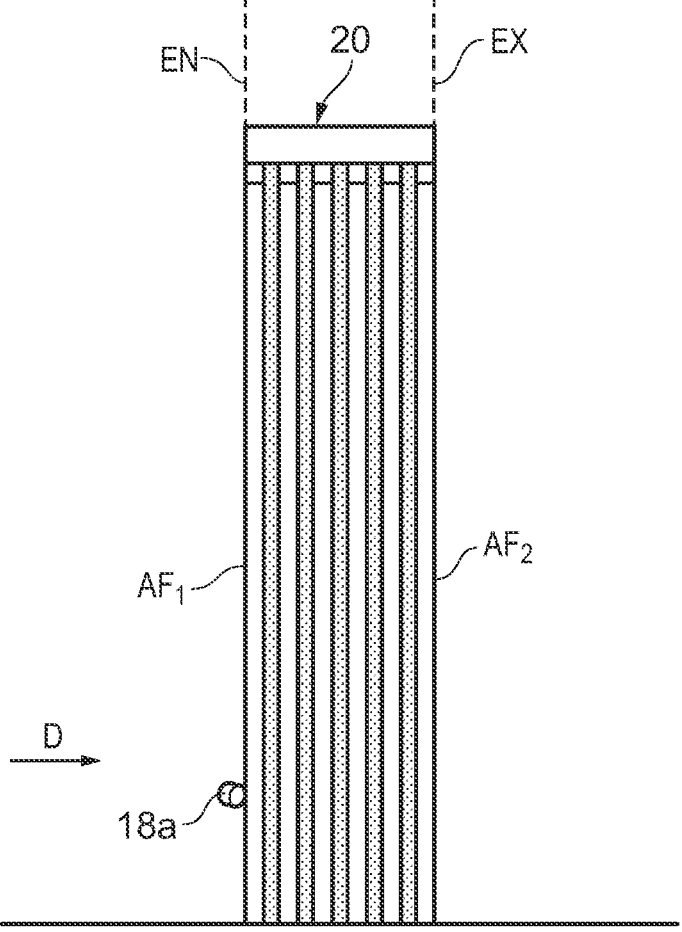
FIG. 3 is schematic diagram showing a longitudinal cross-section view of the vehicle imaging station of FIG. 1.

Referring additionally to FIGS. 2 and 3, structured lighting arch 16 has a structure light array 20 comprising of a number of panel portions 20a-20g. A first panel portion 20a defines a major side portion and is spaced from a second panel portion 20b defining a second major side portion by a distance D to define a structured lighting space S between them. The distance can for example be 2.5 m. The distance between the panel portions can be less than or equal to 5 m.

The structured lighting space has a central axis or vertical plane A and is sized to enable the vehicle 12 to be driven along the central axis A, along the road way 14, through the structured lighting space S from an entry plane EN to an exit plane EX. The first panel portion 20a and the second panel portion 20b each face the structured lighting space S to project a structured light pattern into the structured lighting space S.

The illustrated embodiment also includes an optional roof portion 20e spanning the first and second panel portions 20a, 20b and being arranged to project a structured light pattern onto the roof of the vehicle 12. The regions 20d, 20e where the panel portions 20a, 20b meet the roof portion 20c can be curved to define a smooth, continuous pattern around the vehicle 12. Base regions 20f, 20g of the first and second panel portions 20a, 20b can be curved inwardly so as to be convex with respect to the central axis A, which can aid with observing dents on the curved undersides of the rear of 12 vehicle 12, as described below.

In the illustrated embodiment, the panel portions 20a, 20b, 20c are generally rectangular in shape and the first and second panel portions are arranged generally parallel with respect to one another, symmetrical about the central axis A. Each panel 20a-20g has a width of 1.15 m but in other embodiments can have any suitable with such as a width between 0.5 m and 3 m, in one case being less than or equal to 2 m so as to provide a small mechanical footprint.

The arch 16 can include a structural frame 22 can be provided around the structure light panel portions 20 to support and increase rigidity of the arch 20.

The arch 16 can be provided with conventional dent detection cameras (not shown) arranged to look through holes in the arch panels with their optical axes perpendicular to the axis A to image the sides and roof of the vehicle 12 as it passes through the arch 16.

The vehicle imaging station according to certain embodiments differs from known systems in that it includes a pair of angled dent detecting cameras 18a, 18b arranged adjacent to an axial face AF1 of the structured light array 20 and orientated into the arch 16 such that each camera 18a 18b sees the structured light panel portion on the other side of the arch 16 in reflection in the rear of the vehicle 12 as the vehicle exits the arch 16.

Figure 4:
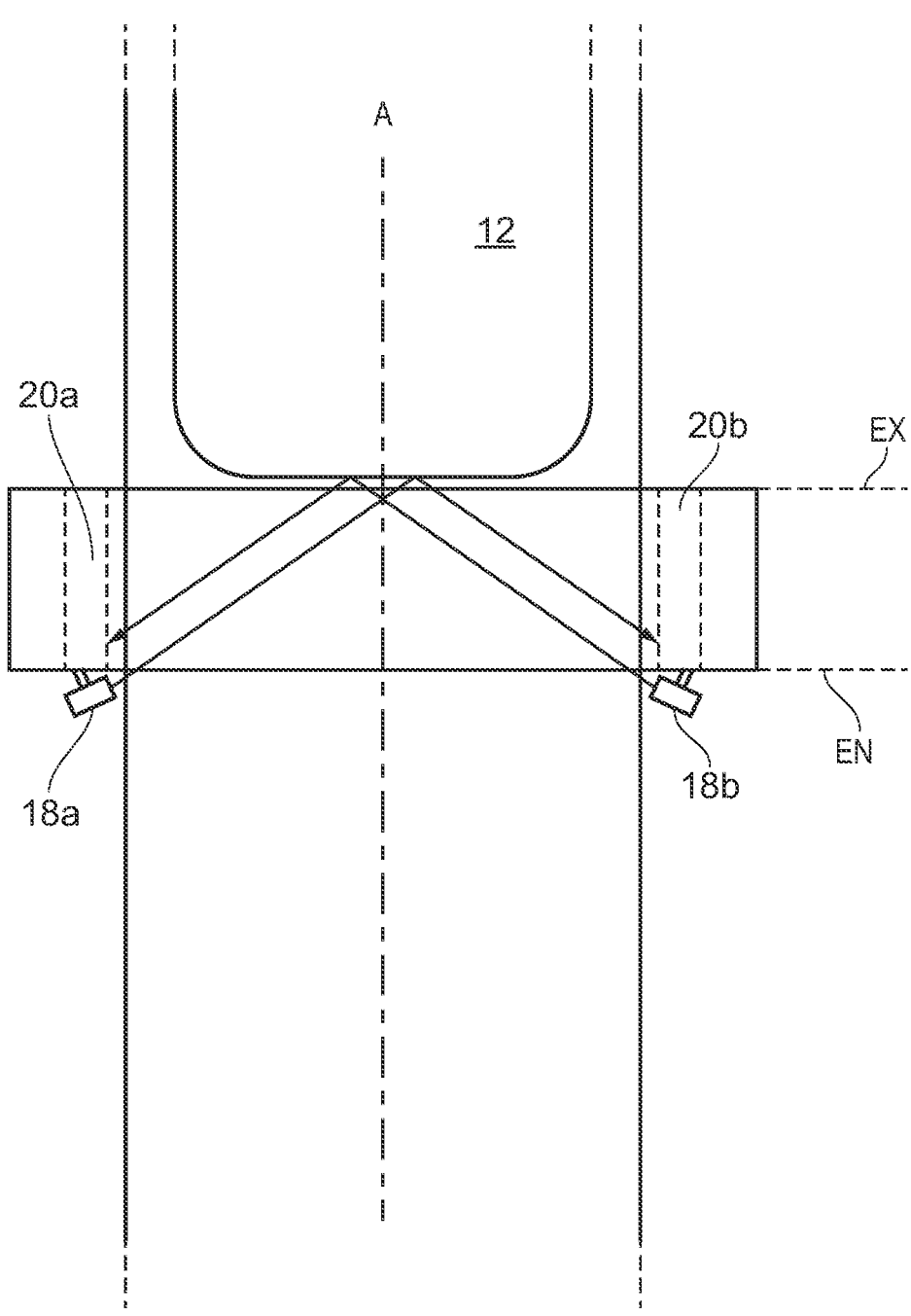
FIG. 4 is a schematic diagram showing a view from above of the vehicle imaging station of FIG. 1, illustrating camera orientation.
Figure 5:
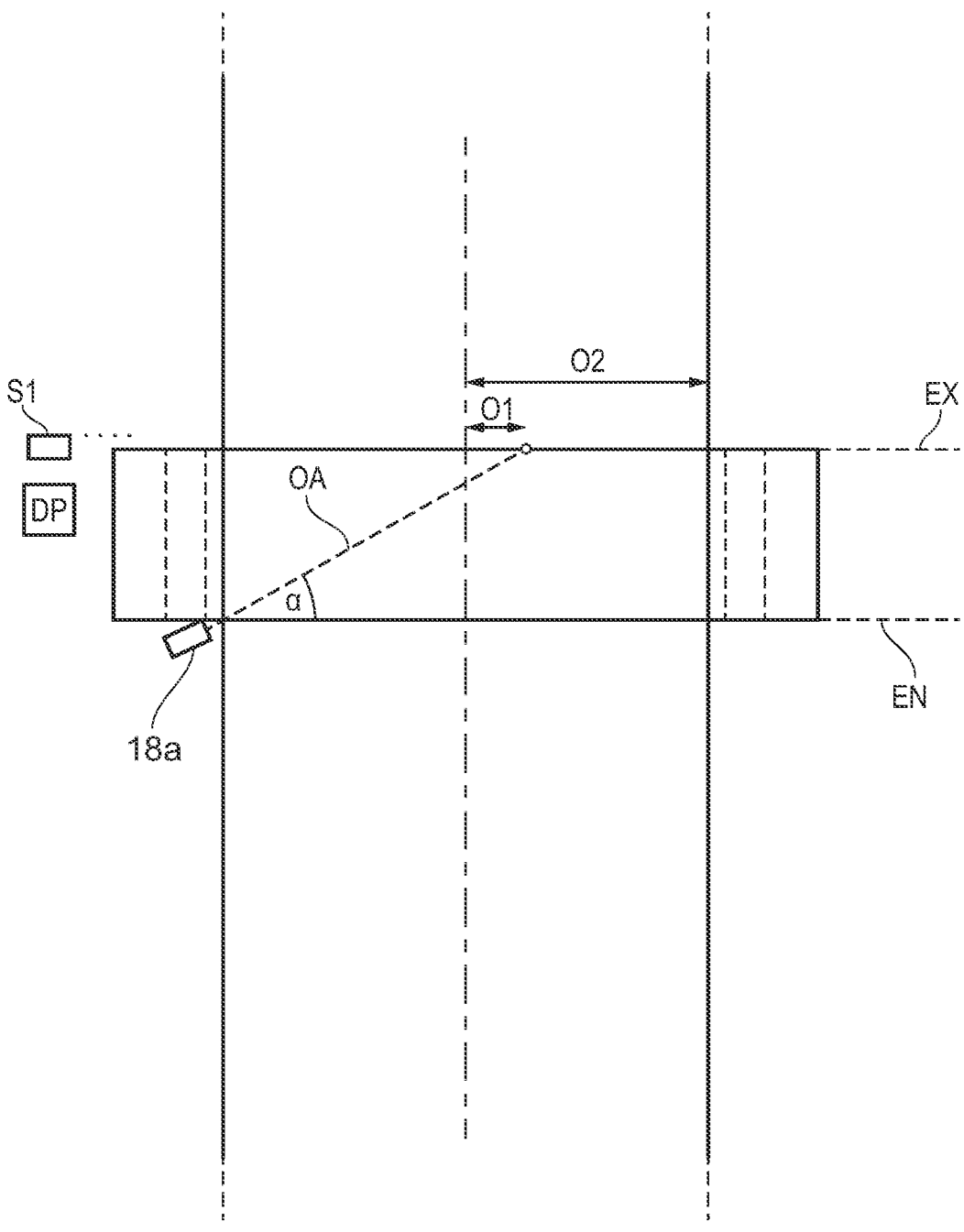
FIG. 5 is a schematic diagram showing a view from above of the vehicle imaging station of FIG. 1, illustrating camera orientation.

Referring additionally to FIGS. 4 and 5, the first camera 18a is mounted adjacent to a side of the first panel portion 20a closest to the entry plane EN on a first side of the central axis A and being orientated to face the exit plane EN on a second side of the central axis A. Likewise, the second camera 18b is mounted adjacent to a side of the second panel portion 20b closest to the entry plane EN on the second side of the central axis A and is orientated to face the exit plane EN on the first side of the central axis A.

As the vehicle 12 is driven through the structured lighting space S, the first camera 18a sees the second panel portion 20b including curved base portion 20g of the structured light source 20 in reflection via the rear right hand side of the vehicle 12 (on the second side of the central axis) as it passes the exit plane EX. Likewise, the second camera 18b sees the first panel portion 20a including curved base portion 20f of the structured light source 20 in reflection via the rear left hand side of the vehicle 12 (on the first side of the central axis A) as it passes the exit plane EN.

Thus, the vehicle imagining station 10 enables dents on the rear of the vehicle 12 to be imaged using conventional structured light panel portions arranged to illuminate the sides of the vehicle, increasing the amount of dent damage which can be imaged in a single pass.

The term "adjacent" can mean less than or equal to 0.5 m, in one case less than or equal to 0.3 m, in another case less than or equal to 0.2 m, and in another case less than or equal to 0.15 m. The closer the cameras are to the sides of the respective panel portions, the smaller the distance can be between the first and second panel portions. The distance can refer to the distance between a point at which the camera's optical axis extends from the lens to the side of the panel portion. In the illustrated embodiment the cameras at mounted at the sides of the panel portions and spaced by roughly 0.1 m.

The cameras 18a, 18b can be orientated such that the angle a between their optical axes OA and the entry plane EN is between 45 degrees and 20 degrees. An angle of roughly 40 degrees can enable dents to be reliably observed across the full width of the rear of a vehicle. This can result in the optical axis of the camera intersecting the exit plane EX at a point which is offset from the central axis A by a distance O1 which is less than half of a distance O2 corresponding to 50% of the arch width D.

The first and second camera can each be mounted at a height of between 0.1 m and 2 m, in one case between 0.2 m and 1.5 m. A height of roughly 0.6 m can enable dents to be reliably observed across the full width of the rear of a vehicle.

A first sensor S1 is arranged to activate the cameras 18a, 18b as the vehicle 12 leaves the structured lighting space S. The sensor can comprise a laser emitter, a light sensor and a mirror, configured such that when the rear of the vehicle 12 is about pass the exit plane EX, the laser beam hits the light sensor.

In use, the station can detect when the rear portion of a vehicle at or in the region of the exit plane and capture one or more images of the rear portion of a vehicle using the first and second cameras. The skilled person can determine how close the rear of the vehicle has to be to the exit plane in order to see the striped pattern based on the distance D, the width of each structured light panel and the camera angle.

The striped patterns can be captured by the dent detecting cameras in order to create a stop motion-like set of images as the vehicle is moving along the axis A. Should the vehicle have a dent in the bodywork at the rear, the striped reflections will distort around the dent, for example creating a circle like shape in the reflection. The images captured by the dent detection cameras can then be used retrospectively to analyze whether a vehicle has dents at a certain point in time.

Figure 6:
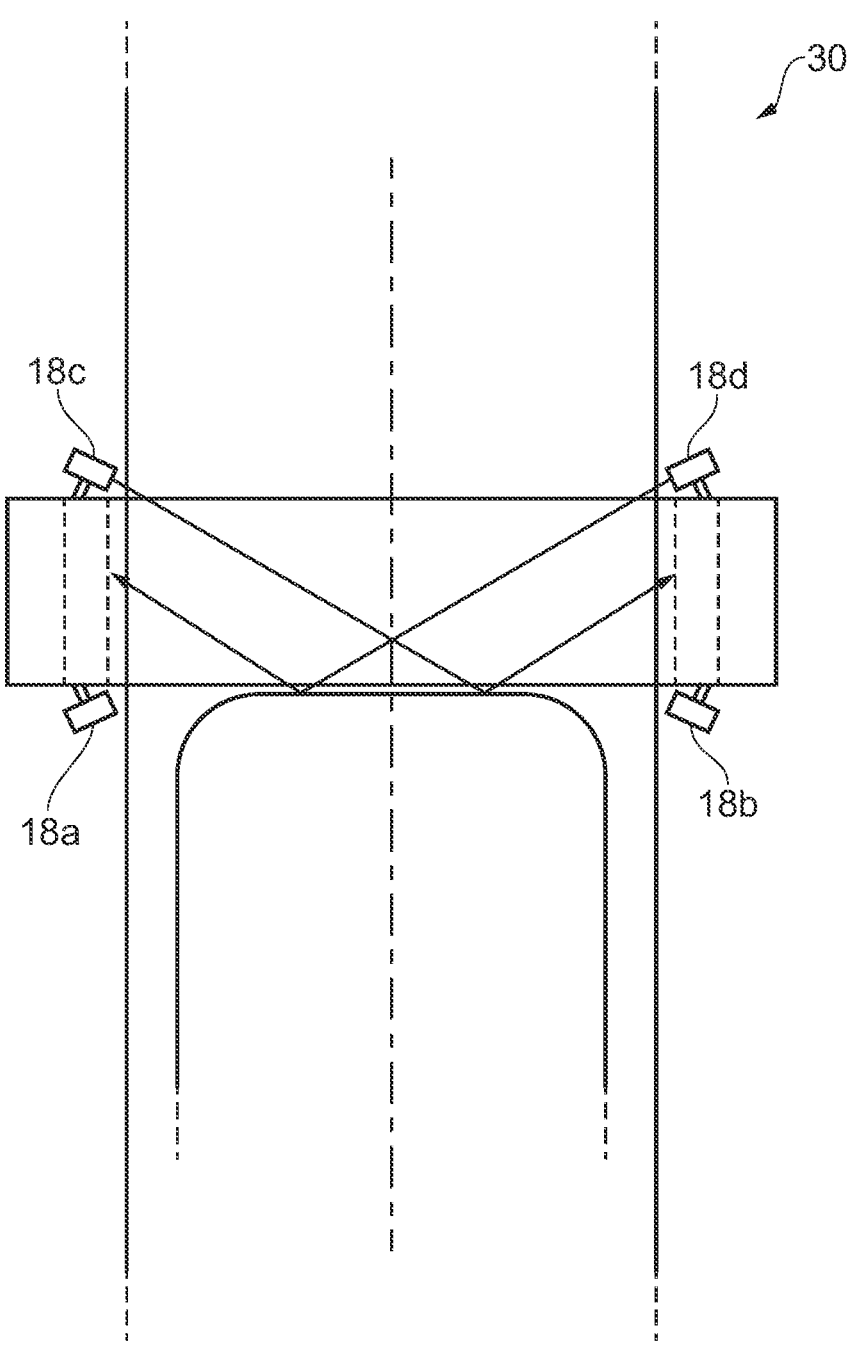
FIG. 6 is schematic diagram showing a view from above of a vehicle imaging station according to a further embodiment.

FIG. 6 shows a vehicle imaging station according to a further embodiment, which differs from the embodiment 10 of FIGS. 1 to 5 in that it also includes a second pair of dent cameras 18c, 18d configured on the opposite side of the arch to capture dent images of the front of the vehicle 12 as it reaches the entrance plane EN.

In other embodiment, an imaging station can have just the cameras 18c, 18d, although it may be desired to have cameras 18a, 18b which image the rear of the vehicle 12 since generally the rear of a vehicle is more susceptible to dent damage than the front.

In any embodiment the cameras can comprise scan cameras such as Hikvision™ MV-CA050-10GC cameras. The cameras can be mounted on the arch 16, for example mounted on the side portions 22a, 22b of the frame.

In any embodiment, a data processor DP can be provided to trigger the dent cameras in response to signals from sensors such as S1. The cameras can be arranged to take a sequence of images as the reflected images of the structured light portions move laterally across the vehicle.

In any embodiment, the structured light source can comprise a set of LED strips arranged in parallel. The LED strips can extend along each light array, from the bottom to the top (and across the arch where lights are provided above the imaging volume). LEDs can for example comprise ultra bright cool white LED tape, with a luminosity of 2880 lumens per meter. In one example a set of twenty LED strips can be arranged into 14.2 mm wide grooves spaced 16 mm apart and set 9 mm deep with a 10 mm backing behind them. Semi opaque frosted diffusers (not pictured) can be provided over each strip of LEDs to create a flat light from each strip of tape. In other embodiments each light source can comprise a laser projector configured to project one or more light patterns.

Although the invention has been described above with reference to one or more certain embodiments, it will be appreciated that various changes or modifications can be made without departing from the scope of the invention as defined in the appended claims. Embodiments of the invention extend to an arrangement having fewer than four scratch detecting cameras, for example a single forward and rear facing camera, and the patterned portion does not need to be between the non-patterned portions. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

What is claimed is:

1. A vehicle imaging station comprising:
   a structured light source comprising a first panel portion and a second panel portion, the first panel portion being spaced from the second panel portion to define a structured lighting space between them, the structured lighting space having a central axis and being sized to enable a vehicle to be driven through the structured lighting space from an entry plane to an exit plane, the first panel portion and the second panel portion each facing the structured lighting space to project a structured light pattern into the structured lighting space;

a first dent detecting camera mounted adjacent to a side of the first panel portion closest to the entry plane on a first side of the central axis and being orientated to face the exit plane on a second side of the central axis; and a second dent detecting camera mounted adjacent to a side of the second panel portion closest to the entry plane on the second side of the central axis and being orientated to face the exit plane on the first side of the central axis, such that, as a vehicle is driven through the structured lighting space, the first dent detecting camera sees the second panel portion of the structured light source in reflection via the rear right hand side of the vehicle as it passes the exit plane on the second side of the central axis and the second dent detecting camera sees the first panel portion of the structured light source in reflection via the rear left hand side of the vehicle as it passes the exit plane on the first side of the central axis, wherein adjacent is less than or equal to 0.3 m, wherein the dent detecting cameras are orientated such that the angle between their optical axes and the entry plane is between 45 degrees and 30 degrees, wherein the first panel portion and second panel portion each have a width of less than or equal to 3 m, and wherein the distance between the panel portions is less than or equal to 5 m.

2. The vehicle imaging station according to claim 1, wherein the structured lighting source is configured as an arch, with a roof portion spanning the first and second panel portions and being arranged to project a structured light pattern onto the roof of the vehicle.

3. The vehicle imaging station according to claim 2, wherein regions where the panel portions meet the roof portion are curved.

4. The vehicle imaging station according to claim 2, wherein base regions of the first and second panel portions are curved so as to be convex with respect to the central axis.

5. The vehicle imaging station according to claim 1, wherein the first and second dent detecting cameras are each mounted at a height of between 0.1 m and 2 m.

6. The vehicle imaging station according to claim 1, wherein the first panel portion is arranged parallel with respect to the second panel portion.

7. The vehicle imaging station according to claim 1 wherein adjacent is less than or equal to 0.2 m.

8. The vehicle imaging station according to claim 1, further comprising a data processor and a sensor, the sensor being arranged to detect when the rear of the vehicle is at or in the region of the exit plane and transmit a signal to the data processor which causes the data processor to fire the first and second dent detecting cameras one or more times.

9. The vehicle imaging station according to claim 1, wherein the structured light pattern comprises a plurality of parallel strips of light.

10. The vehicle imaging station according to claim 1, wherein the first panel portion and the second panel portion each comprises a plurality of parallel illuminating strips, each illuminating strip being spaced from an adjacent illuminating strip by a non-illuminating strip.

11. The vehicle imaging station according to claim 1, wherein the structured light source comprises a light array with LED strips arranged in parallel.

12. A computer implemented method of imaging dents on a vehicle using the vehicle imaging station according to claim 1, the method comprising:

detecting when the rear portion of a vehicle at or in the region of the exit plane; and capturing one or more images of the rear portion of a vehicle using the first and second dent detecting cameras.

13. A vehicle imaging station comprising:

a structured light source comprising a first panel portion and a second panel portion, the first panel portion being spaced from the second panel portion to define a structured lighting space between them, the structured lighting space having a central axis or vertical plane and being sized to enable a vehicle to be driven along a pathway on a road surface aligned with the central axis or vertical plane through the structured lighting space from an entry plane to an exit plane, the first panel portion and the second panel portion each facing the structured lighting space to project a structured light pattern into the structured lighting space;

a first camera mounted adjacent to a side of the first panel portion closest to the exit plane on a first side of the central axis and being orientated to face the entry plane on a second side of the central axis; and a second camera mounted adjacent to a side of the second panel portion closest to the exit plane on the second side of the central axis and being orientated to face the entry plane on the first side of the central axis, such that, as a vehicle is driven into the structured lighting space, the first camera sees the second panel portion of the structured light source in reflection via the front right hand side of the vehicle as it passes the entry plane on the second side of the central axis and the second camera sees the first panel portion of the structured light source in reflection via the front left hand side of the vehicle as it passes the entry plane on the first side of the central axis, wherein adjacent is less than or equal to 0.3 m, wherein the cameras are orientated such that the angle between their optical axes and the entry plane is between 45 degrees and 30 degrees, wherein the first panel portion and second panel portion each have a width of less than or equal to 3 m, and wherein the distance between the panel portions is less than or equal to 5 m.

14. The vehicle imaging station according to claim 13, wherein the structured light pattern comprises a plurality of parallel strips of light.

15. The vehicle imaging station according to claim 13, wherein the first panel portion and the second panel portion each comprises a plurality of parallel illuminating strips, each illuminating strip being spaced from an adjacent illuminating strip by a non-illuminating strip.

16. The vehicle imaging station according to claim 13, wherein the structured light source comprises a light array with LED strips arranged in parallel.

* * * * *